United States Patent
Bill et al.

(10) Patent No.: US 10,336,143 B2
(45) Date of Patent: Jul. 2, 2019

(54) TYRE DEFLECTION MONITORING

(71) Applicant: Airbus Operations Limited, Bristol (GB)

(72) Inventors: Andrew Bill, Bristol (GB); David Joel Clarke, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 58 days.

(21) Appl. No.: 15/591,369

(22) Filed: May 10, 2017

(65) Prior Publication Data

US 2017/0326927 A1    Nov. 16, 2017

(30) Foreign Application Priority Data

May 11, 2016  (GB) .................................. 1608281.0

(51) Int. Cl.
*B60C 23/04*    (2006.01)
*H04Q 9/00*    (2006.01)

(52) U.S. Cl.
CPC ...... *B60C 23/0486* (2013.01); *B60C 23/0408* (2013.01); *H04Q 9/00* (2013.01)

(58) Field of Classification Search
CPC .............................. B60C 23/0486; H04Q 9/00
See application file for complete search history.

(56) References Cited

U.S. PATENT DOCUMENTS

| | | | | | |
|---|---|---|---|---|---|
| 3,900,828 | A * | 8/1975 | Lage | ..................... | B60C 23/007 244/1 R |
| 4,160,234 | A * | 7/1979 | Karbo | ................. | B60C 23/0498 200/61.23 |
| 4,283,707 | A * | 8/1981 | Church | ............... | B60C 23/0401 244/103 R |
| 5,793,285 | A * | 8/1998 | Wehinger | .............. | B60C 23/067 116/34 R |
| 6,952,956 | B2 * | 10/2005 | Dufournier | ........... | B60C 23/061 73/146 |
| 7,320,246 | B2 * | 1/2008 | Schick | .................... | B60C 11/24 702/188 |
| 7,945,422 | B2 * | 5/2011 | Vetsch | ................... | G01G 19/07 701/29.1 |
| 8,543,322 | B1 * | 9/2013 | Nance | .................... | G01G 19/07 701/120 |
| 2001/0025679 | A1 * | 10/2001 | Dufournier | ........... | B60C 23/061 152/516 |
| 2003/0050743 | A1 | 3/2003 | Caretta et al. | | |

(Continued)

FOREIGN PATENT DOCUMENTS

EP    1 281 949    2/2003
EP    2 208 971    7/2010

(Continued)

*Primary Examiner* — Nay Tun
(74) *Attorney, Agent, or Firm* — Nixon & Vanderhye P.C.

(57) ABSTRACT

An apparatus for monitoring deflection of a tire including a non-transitory memory, storing tire behavior information which relates tire deflection to tire load and tire pressure; and a controller in communication with the memory. The controller is configured to: receive load information which relates to a load on the tire; receive pressure information which relates to a pressure of the tire; and determine a deflection of the tire based on the received load information, the received pressure information, and the stored tire behavior information.

18 Claims, 4 Drawing Sheets

(56) References Cited

U.S. PATENT DOCUMENTS

| | | |
|---|---|---|
| 2005/0046558 A1 | 3/2005 | Buenz et al. |
| 2007/0010928 A1* | 1/2007 | Brusarosco ............ B60C 23/064 |
| | | 701/70 |
| 2007/0240501 A1* | 10/2007 | Mancosu ............ B60C 23/0408 |
| | | 73/146 |
| 2008/0033607 A1 | 2/2008 | Zeliff et al. |
| 2017/0116617 A1* | 4/2017 | Nance .................... G01G 19/07 |

FOREIGN PATENT DOCUMENTS

| | | |
|---|---|---|
| EP | 2 832 561 | 2/2015 |
| GB | 2 311 886 | 10/1997 |
| JP | 06219114 | 8/1994 |
| WO | WO 01/08908 | 2/2001 |
| WO | 2013/015780 | 1/2013 |

* cited by examiner

TYRE DEFLECTION MONITORING

RELATED APPLICATION

This application claims priority to United Kingdom Patent Application GB1608281.0 filed May 11, 2016, the entire contents of each of which are hereby incorporated by reference.

TECHNICAL FIELD

The present invention relates to an apparatus for monitoring deflection of a tyre, and in particular to an apparatus for monitoring the deflection of a tyre installed on an aircraft.

BACKGROUND

If a tyre is under-inflated, or if it experiences a higher load than intended (for example because a neighbouring tyre on the same axle is under-inflated), the tyre wall may deflect more than it was designed to. An over-deflected tyre, when rolling, will experience forces that can potentially cause damage to the tyre. Aircraft maintenance manuals therefore require an aircraft tyre to be replaced if the pressure in that tyre falls below a certain level, or if the differential pressure between a pair of tyres on the same axle exceeds a particular limit.

It is likely that some tyres are replaced under this policy when they have not been over-deflected and therefore will not have suffered any damage. For example, if a neighbouring tyre on the same axle as an under-inflated tyre is sufficiently inflated, the neighbouring tyre may take enough load to prevent either tyre over-deflecting. This situation may particularly occur on aircraft where the main landing gear comprises more than two posts.

The present invention seeks to address this issue by providing a system for detecting and/or monitoring the actual deflection experienced by a tyre. Such a system can advantageously reduce or eliminate the time and material costs associated with replacing tyres which have not suffered damage due to over-deflection. Alternatively or additionally, such a system can advantageously provide a clear indication that a tyre needs to be replaced.

SUMMARY

A first aspect of the present invention provides an apparatus for monitoring deflection of a tyre. The apparatus comprises a memory, storing tyre behaviour information which relates tyre deflection to tyre load and tyre pressure; and a controller in communication with the memory. The controller is configured to: receive load information which relates to a load on the tyre; receive pressure information which relates to a pressure of the tyre; and determine a deflection of the tyre based on the received load information, the received pressure information, and the stored tyre behaviour information.

Optionally, the load information comprises a measurement of a load on an axle of a wheel on which the tyre is installed.

A further wheel may be additionally mounted on the axle, in which case optionally the controller is further configured to receive pressure information for a further tyre installed on the further wheel. The controller may be configured to calculate a load on the tyre based on the axle load measurement, the tyre pressure information, and the further tyre pressure information.

Optionally, the controller is further configured to determine whether the tyre should be replaced, based on the determined deflection. The controller may be configured to determine whether the tyre should be replaced by determining whether the determined deflection meets a predefined deflection criterion. The predefined deflection criterion may comprise a deflection threshold, such that a determined deflection greater than the threshold meets the criterion and a determined deflection less than the threshold does not meet the criterion.

Optionally, the controller is further configured to receive rotation information relating to rotation of a wheel on which the tyre is installed. The controller may be configured to determine whether the tyre should be replaced additionally based on the received rotation information.

Optionally, the controller is configured to determine whether the tyre should be replaced by determining whether the received rotation information meets a predefined rotation criterion. The predefined rotation criterion may be defined such that the received rotation information meets the rotation criterion if it indicates that the tyre has rotated during a selected time period, and does not meet the rotation criterion if it indicates that the tyre has not rotated during the selected time period. The selected time period may be a time period during which the determined deflection meets the predefined deflection criterion.

Optionally, the controller is configured to determine that the tyre should be replaced if: the determined deflection exceeds a first threshold; or the determined deflection exceeds a second threshold lower than the first threshold, and the received rotation information indicates that the tyre has rotated during a time period for which the determined deflection exceeds the second threshold. The controller may be configured to determine that the tyre should not be replaced if: the determined deflection is between the second threshold and the first threshold, and the received rotation information indicates that the tyre has not rotated during a time period for which the determined deflection exceeds the second threshold.

Optionally, the controller is configured to determine whether a further tyre should be replaced, based on the determination of whether the tyre should be replaced, wherein the further tyre is installed on a wheel mounted on the same axle as the wheel on which the tyre is installed.

Optionally, the tyre behaviour information comprises one or more of: information relating to characteristic deflection behaviour of the tyre; a dataset of measurements of the deflection of the tyre at various different tyre pressures and/or tyre loads; a set of tyre load versus tyre deflection curves for various different tyre pressures; a mathematical model of the tyre; a look-up table; a mathematical relationship relating tyre deflection, tyre pressure and tyre load.

Optionally, the controller is further configured to output a signal based on the determined deflection.

Optionally, the tyre is an aircraft tyre.

A second aspect of the present invention provides an aircraft comprising an apparatus according to the first aspect; a load sensor configured to measure the load on an axle of a wheel on which a tyre is installed and to transmit an axle load measurement to the apparatus; and a pressure sensor configured to measure the pressure of the tyre and to transmit a tyre pressure measurement to the apparatus.

Optionally, the aircraft further comprises a further pressure sensor configured to measure the pressure of a further tyre and to transmit a further tyre pressure measurement to the apparatus, wherein the further tyre is installed on a wheel mounted on the same axle as the wheel on which the tyre is installed.

Optionally, the aircraft further comprises a rotation sensor configured to detect rotation of a wheel on which the tyre is installed and to transmit rotation information to the apparatus.

BRIEF DESCRIPTION OF THE DRAWINGS

Embodiments of the invention will now be described, by way of example only, with reference to the accompanying drawings, in which.

DETAILED DESCRIPTION

The following disclosure relates to systems and processes for determining and/or monitoring the deflection experienced by a tyre, e.g. a tyre in use on an aircraft, at any given point in time. Such systems and processes can thereby enable a determination of whether or not an over-deflection has actually occurred, which may in turn be used to determine whether or not a given tyre should be replaced.

Figure 1:
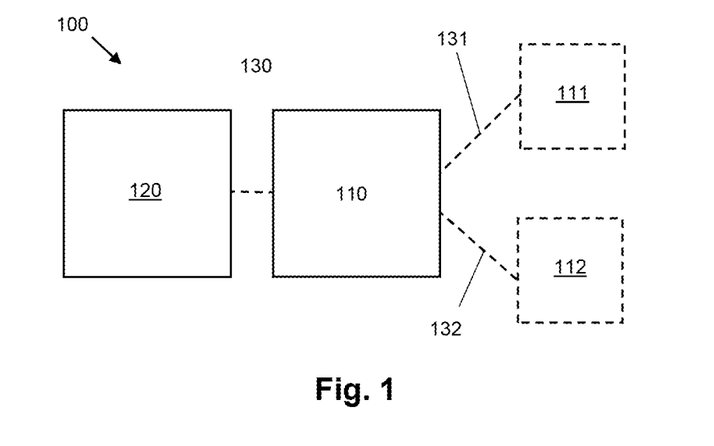
FIG. 1 is a schematic view of an apparatus for monitoring deflection of a tyre, according to an embodiment.

FIG. 1 shows an apparatus 100 for monitoring deflection of a tyre. The apparatus 100 comprises a memory 120 and a controller 110 in communication with the memory 120. The memory 120 and controller 110 can be comprised in a single device (e.g. a portable handheld device, or an aircraft avionics device). Alternatively the memory can be provided remotely from the controller 110. The memory 120 stores tyre behaviour information which relates tyre deflection to tyre load and tyre pressure. The memory 120 can comprise any suitable implementation of a computer readable storage medium, such as a hard drive, flash memory, non-volatile memory, etc. The controller 110 can comprise any suitable implementation of a processing unit for receiving and processing data.

The controller 110 is configured to receive load information which relates to a load on the tyre, e.g. from a load sensor 111, via a wired or wireless communications link. The controller 110 is further configured to receive pressure information which relates to a pressure of the tyre, e.g. from a pressure sensor 112, via a wired or wireless communications link. The controller is further configured to determine a deflection of the tyre based on the received load information, the received pressure information, and the stored tyre behaviour information.

The controller 110 can be configured to receive the load information and/or the pressure information in real-time. The controller 110 can be configured to continuously receive load and/or pressure information, or alternatively can periodically receive discrete items of load information and or discrete items of pressure information. In some examples the controller 110 is configured to request load information from the load sensor 111 (e.g. by transmitting a control signal to the load sensor 111), and to receive the load information in response to such a request. In some examples the controller 110 is configured to request pressure information from the pressure sensor 112 (e.g. by transmitting a control signal to the pressure sensor 112), and to receive the pressure information in response to such a request. In some examples the controller 110 is configured to receive load information and/or pressure information during a selected time period, e.g. a time period during which the aircraft is on the ground. In some examples the load information comprises one or more measured values of a quantity other than load, e.g. pressure of a further tyre.

The load sensor 111 and the pressure sensor 112 are not part of the apparatus 100 and are therefore shown using dashed lines in FIG. 1. The load sensor 111 may comprise any suitable load sensing device or system. For example, the load sensor 11 can comprise an optical-fibre based sensor (such as a Fibre Bragg Grating (FBG) load sensor; a strain gauge, a capacitive load cell, a piezoelectric load cell, etc. The pressure sensor 112 may comprise any suitable pressure sensing device or system. In some examples, the pressure sensor 112 comprises or is comprised in a tyre pressure indicator system (TPIS) of an aircraft on which the apparatus 100 is installed. The tyre pressure sensor may be accurate to +/−0.2 bar, under normal operating conditions.

"Tyre deflection" refers to the amount of deformation experienced by a tyre wall due to a load on the tyre. It is a function of the tyre pressure and the vertical load carried by the tyre. Tyre deflection is normally measured in terms of a percentage deflection, and various ways of calculating a tyre deflection are known in the art. In the following disclosure, tyre deflection is calculated as follows.

Figure 2A:
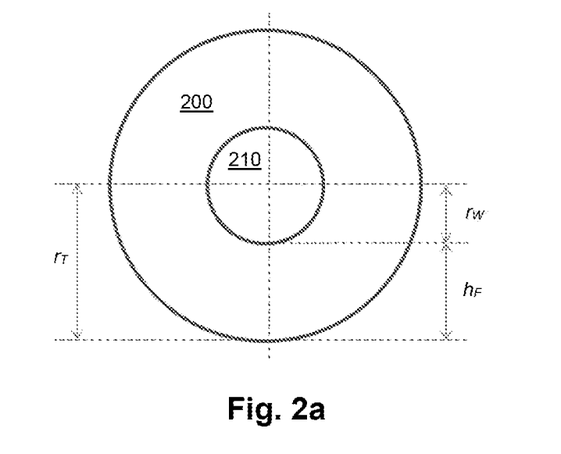
FIGS. 2a and 2b illustrate how tyre deflection is defined.

FIG. 2a shows a tyre 200 in an undeflected state (e.g. when the tyre is not loaded). In the undeflected state, the tyre 200 has a radius $r_T$, which is the sum of a radius $r_W$ of a wheel 210 on which the tyre is mounted, and a "free" height $h_F$ of the undeflected tyre wall. The free height is therefore given by the expression:

$$h_F = r_T - r_W \quad \text{(Equation 1)}$$

Figure 2B:
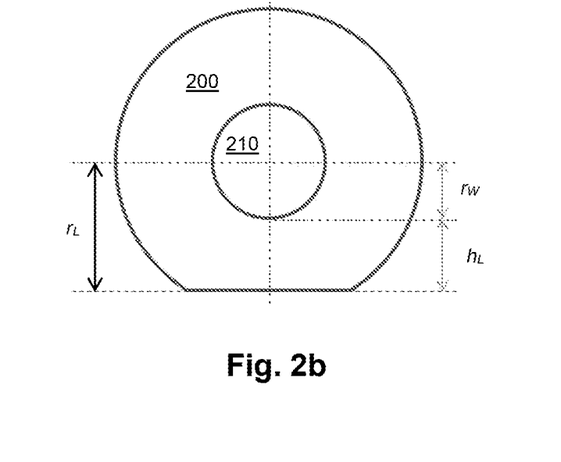

FIG. 2b shows the same tyre 200 in a deflected state (e.g. when the tyre is sufficiently loaded to deform the tyre wall). In the deflected state, the tyre 200 has a loaded radius $r_L$, which is the sum of the wheel radius $r_W$, and a "loaded" height $h_L$ of the deflected tyre wall. The wheel radius $r_W$ remains constant, whilst the loaded height $h_L$ of a deflected tyre is necessarily less than the free height $h_F$ (otherwise the tyre would not be deflected). The percentage deflection D is therefore given by:

$$D = \frac{h_F - h_L}{h_F} \quad \text{(Equation 2)}$$

For the purposes of the following disclosure, all references to deflection should be considered to refer to a percentage deflection calculated in accordance with Equation 2.

The load information that the controller 110 is configured to receive may comprise a measured load value, e.g. of a load at a selected location on an axle. In some examples the load information comprises a plurality of measured load values, e.g., a time-series of measured load values. In some examples the load information relates to a selected time period, e.g. a time period during which an aircraft on which the apparatus 100 is installed is on the ground. In some such examples the load information comprises a time-series of values for the selected time period. In some examples load information for a selected time period is received by the controller 110 continuously (either periodically or in real-time) during the time period. Alternatively, load information for the whole of a selected time period can be received by the controller as a single item of information, e.g. at the end of the selected time period. In some examples the load information comprises an average of a plurality of measured load values.

The load information can comprise any information from which the load on the tyre can be determined. In a particular example, the load information comprises a measurement of a load on an axle of a wheel on which the tyre is installed (hereinafter referred to as an "axle load measurement". It will be appreciated that in cases where only one wheel is installed on the axle the load on the axle will be equal to the load on the tyre, and therefore the axle load measurement can be considered to indicate the load on the tyre. However; for commercial aircraft it is typically the case that two wheels will be installed on a common axle. In such cases the total load on the axle will be shared between the two tyres, according to a ratio dependent on the differential pressure of the two tyres.

Figure 3:
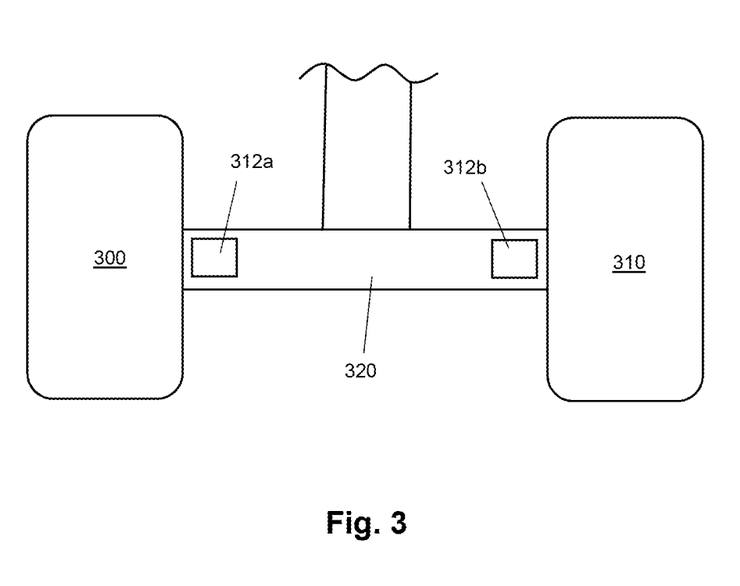
FIG. 3 is a schematic view of a pair of tyres on a common axle having load sensors according to an embodiment.

In some examples in which a pair of tyres share a common axle (i.e. a further wheel is additionally mounted on the axle), the load information comprises a measurement of a load on the axle at a location immediately adjacent or very close to the wheel on which the tyre is mounted. This arrangement is illustrated by FIG. 3, in which a subject tyre 300 (i.e. a tyre for which it is desired to determine a deflection) and a further tyre 310 are mounted on a common axle 320. A first load sensor 312a is arranged on the axle 320 adjacent a wheel on which the subject tyre 300 is mounted, for measuring the load on the axle at this location. It is expected that the load on the axle at a location immediately adjacent or very close to the wheel on which a given tyre is mounted will be substantially equal to the load on that tyre. In the particular example of FIG. 3, a second load sensor 312b is arranged on the axle 320 adjacent a wheel on which the further tyre 310 is mounted, for generating load information for use in determining a deflection of the further tyre. However; it will be appreciated that the second load sensor 312b is not necessary for determining a deflection of the subject tyre.

Other examples are possible in which the load information comprises a measurement of a total load on the axle, i.e. the load at the centre of the axle. If the tyre pressure of each tyre is known, then the fraction of this total load reacted by each tyre, and thus the load on each tyre, can be calculated. In such examples, the controller may be further configured to receive pressure information for a further tyre installed on the further wheel, and to calculate a load on the tyre based on the axle load measurement, the tyre pressure measurement, and the further tyre pressure information.

The pressure information that the controller 110 is configured to receive may comprise a measured pressure value, e.g. of a pressure of a fluid in the tyre. In some examples the pressure information comprises a plurality of measured pressure values, e.g., a time-series of measured pressure values. In some examples the pressure information relates to a selected time period, e.g. a time period during which an aircraft on which the apparatus 100 is installed is on the ground. The selected time period may be the same as a selected time period to which received load information relates. In some such examples the pressure information comprises a time-series of values for the selected time period. In some examples pressure information for a selected time period is received by the controller 110 continuously (either periodically or in real-time) during the time period. Alternatively, pressure information for the whole of a selected time period can be received by the controller as a single item of information, e.g. at the end of the selected time period. In some examples the pressure information comprises an average of a plurality of measured pressure values.

The amount of deflection experienced by a tyre is a function of the tyre mechanics, pressure and the vertical load carried by the tyre. This relationship will differ slightly from tyre to tyre, but is constant for a particular tyre type. The stored tyre behaviour information therefore comprises information about the relationship between pressure, load and deflection for the subject tyre. For example, the stored tyre behaviour information can comprise one or more of: information relating to characteristic deflection behaviour of the tyre; a dataset of measurements of the deflection of the tyre at various different tyre pressures and/or tyre loads; a set of tyre load versus tyre deflection curves for various different tyre pressures; a mathematical model of the tyre; a look-up table; a mathematical relationship relating tyre deflection, tyre pressure and tyre load.

The stored tyre behaviour information can comprise information about deflection of the tyre at various load/pressure combinations.

The tyre behaviour information may be specific to the subject tyre. For example, it may have been created based on measurements of the subject tyre. However; it is expected that typically the tyre behaviour information will be specific to a class of tyres in which the subject tyre is comprised. A class of tyres may be defined based on one or more of: tyre type, aircraft on which the tyre is for use, tyre manufacturer, etc. For example, the tyre behaviour information may be applicable to all tyres of a particular type for a particular aircraft (e.g. Airbus A320 nosewheel tyres), made by a particular manufacturer. In some cases, tyres of a particular type from different manufacturers may exhibit behaviour which is sufficiently similar that the stored tyre behaviour information can be applicable to all tyres of a particular type for a particular aircraft, irrespective of manufacturer. The tyre behaviour information may therefore have been created based on measurements of tyres belonging to a certain predefined class.

As mentioned above, the controller 110 is configured to determine a deflection of the tyre based on the received load information, the received pressure information, and the stored tyre behaviour information. The manner in which the determination is performed by the controller 110 will depend on the nature of the stored tyre behaviour information. For example, if the tyre behaviour information comprises a look-up table, determining a deflection by the controller 110 may comprise comparing the received load information and/or the received pressure information to entries in the look-up table. As another example, if the tyre behaviour information comprises a mathematical relationship, determining a deflection by the controller 110 may comprise using the received pressure information and/or the received load information inputs to the mathematical relationship. In some examples the controller 110 is configured to associate a time value with a determined deflection, e.g. such that a time period during which the determined deflection meets a predefined criterion can be defined.

Figure 4:
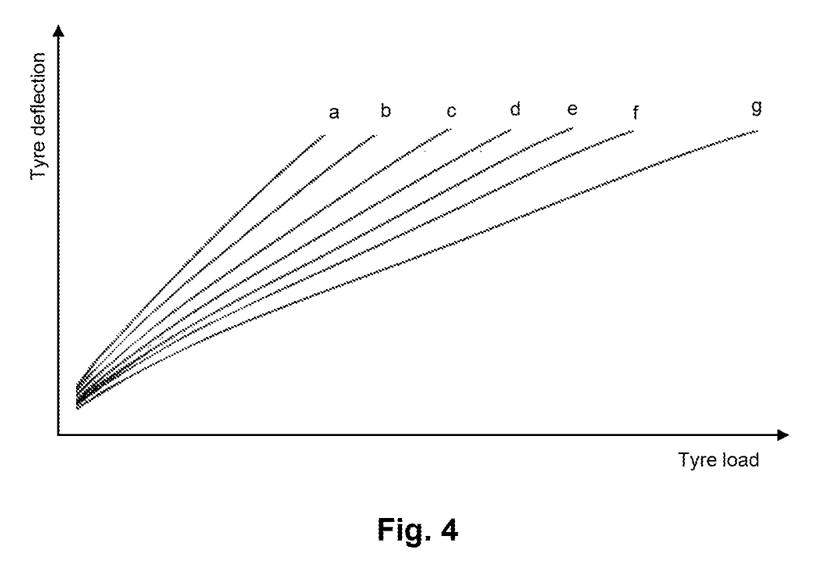
FIG. 4 shows an example set of tyre load versus tyre deflection curves for an example tyre.

A specific example of how the controller 110 can determine a deflection of the subject tyre will now be discussed with reference to FIG. 4. FIG. 4 shows an example of tyre behaviour information for an example subject tyre, which is stored in the memory 120. The tyre behaviour information is in the form of a set of tyre load versus tyre deflection curves (a-g). Each of the curves a-g corresponds to different tyre pressure.

In the specific example, the received pressure information comprises a measured value of the pressure of the subject tyre, obtained at a time T, and the received load information comprises a measured value of a load experienced at a location on an axle on which the subject tyre is mounted (via a wheel), obtained at time T. The axle location is immediately adjacent the wheel of the subject tyre, and the measured value of the axle load is therefore treated by the controller 110 as a measured value of the load on the subject tyre. In other examples in which the received load information cannot be directly treated as a value of the load on the subject tyre, determining the deflection by the controller 110 comprises calculating a value for the load on the subject tyre based on the received load information (e.g. in the manner described above in relation to the situation where the received load information comprises an overall axle load on a two-wheel axle together with pressure information for a further tyre).

The tyre load versus tyre deflection curves a-g can be used to determine a deflection of the example tyre, based on information about the pressure of the example tyre and the load on the example tyre. If, for example, the received pressure information indicates that the pressure of the tyre is equal or substantially equal to a pressure associated with one of the curves (e.g. curve b), then the controller can be configured to determine the deflection to be the deflection indicated by the curve b, for the measured load value. In some examples, if the received pressure information indicates that the pressure of the tyre is within a predefined range (e.g. +/−1 bar) defined with respect to a pressure associated with a given curve, then the controller is configured to determine the deflection to be the deflection indicated by that curve, for a given measured load value. The controller may be configured to determine a deflection by interpolating between known curves, e.g. if the received pressure information indicates that the pressure of the tyre is between values for which curves are available.

In some examples the controller 110 is further configured to determine whether the tyre (i.e. the subject tyre, for which a deflection is to be determined) should be replaced, based on the determined deflection. In some such examples, the controller is configured to determine whether the tyre should be replaced by determining whether the determined deflection meets a predefined deflection criterion. The predefined deflection criterion may be defined in respect of a particular class of tyres, where a class of tyres can be defined as described above in relation to the tyre behaviour information.

In some examples the predefined deflection criterion comprises a deflection threshold, e.g. such that a determined deflection greater than the threshold meets the criterion and a determined deflection less than the threshold does not meet the criterion. The predefined deflection criterion can further specify whether or not a determined deflection equal to the threshold meets the criterion. The deflection threshold can comprise, e.g., a preselected percentage deflection value X, and the predefined deflection criterion can be defined such that it is met by a given determined deflection d, if d≥X, and is not met if d<X.

As discussed above, aircraft maintenance manuals define tyre replacement criteria based on tyre pressure. A predefined deflection criterion for a given tyre or class of tyres may therefore be defined based on known pressure-based tyre replacement criteria for that tyre or class of tyres. For example, threshold deflection values corresponding to pressure thresholds below which a tyre must be replaced, can be determined and the predefined deflection criterion can be defined based on such threshold deflection values.

An example aircraft maintenance manual (AMM) states that a tyre with a pressure of 95-100% of a predefined nominal pressure may be re-inflated and left on the aircraft. In the case that the tyre pressure is between 90-95% of the nominal pressure, the AMM requires that the tyre must be re-inspected the day after re-inflation, and if still under-inflated at the secondary inspection it must be removed from the aircraft. The inventors have determined deflection values corresponding to 90% of nominal tyre pressure (which is the threshold for tyres to remain on the aircraft) for a main landing gear (MLG) tyre and for a nose landing gear (NLG) tyre, each experiencing a typical operating load. They found that the deflection at 90% of nominal pressure varied slightly between the main landing gear tyre and the nose landing gear, but was within the range 34.3% to 35.3%. As discussed above, a tyre at 90% of nominal tyre pressure is allowed to stay on the aircraft. Therefore, a deflection threshold based on the AAM tyre pressure thresholds should be at, or just beyond the deflection values corresponding to 90% of nominal tyre pressure. A suitable deflection criterion for the class of tyres tested could, for example, be defined such that any deflection over 35% is considered an over-deflection, leading the controller 110 to determine that the tyre should be replaced (regardless of the actual tyre pressure).

As discussed above, an over-deflected tyre when rolling will experience forces that can potentially cause damage to the tyre. However; if an over-deflected tyre remains stationary for the entire time that it is over-deflected, it is unlikely that the over-deflection will result in any damage to the tyre. Therefore, in some examples the controller is further configured to receive rotation information relating to rotation of a wheel on which the tyre is installed. In such examples the controller can be configured to determine whether the tyre should be replaced additionally based on the received rotation information. Rotation information can be received, e.g., from a wheel speed sensor of an aircraft on which the apparatus 100 is installed. The rotation information can comprise, for example, one or more measured values of the rotational velocity of a wheel on which the subject tyre is mounted. The rotation information may be associated with a time, e.g. in some examples the rotation information comprises a time-series of measured wheel rotation velocity values.

In some examples the controller is configured to determine whether the tyre should be replaced by determining whether the received rotation information meets a predefined rotation criterion. A predefined rotation criterion can be defined, for example, such that the received rotation information meets the rotation criterion if it indicates that the tyre has rotated during a selected time period, and does not meet the rotation criterion if it indicates that the tyre has not rotated during the selected time period. The controller may be configured to define a selected time period, e.g. based on a determined deflection, a time associated with a determined deflection, and/or on the received load information and the received pressure information. In some examples the selected time period is a time period during which the determined deflection meets the predefined deflection criterion (i.e. a time period during which the tyre is over-deflected).

Figure 5:
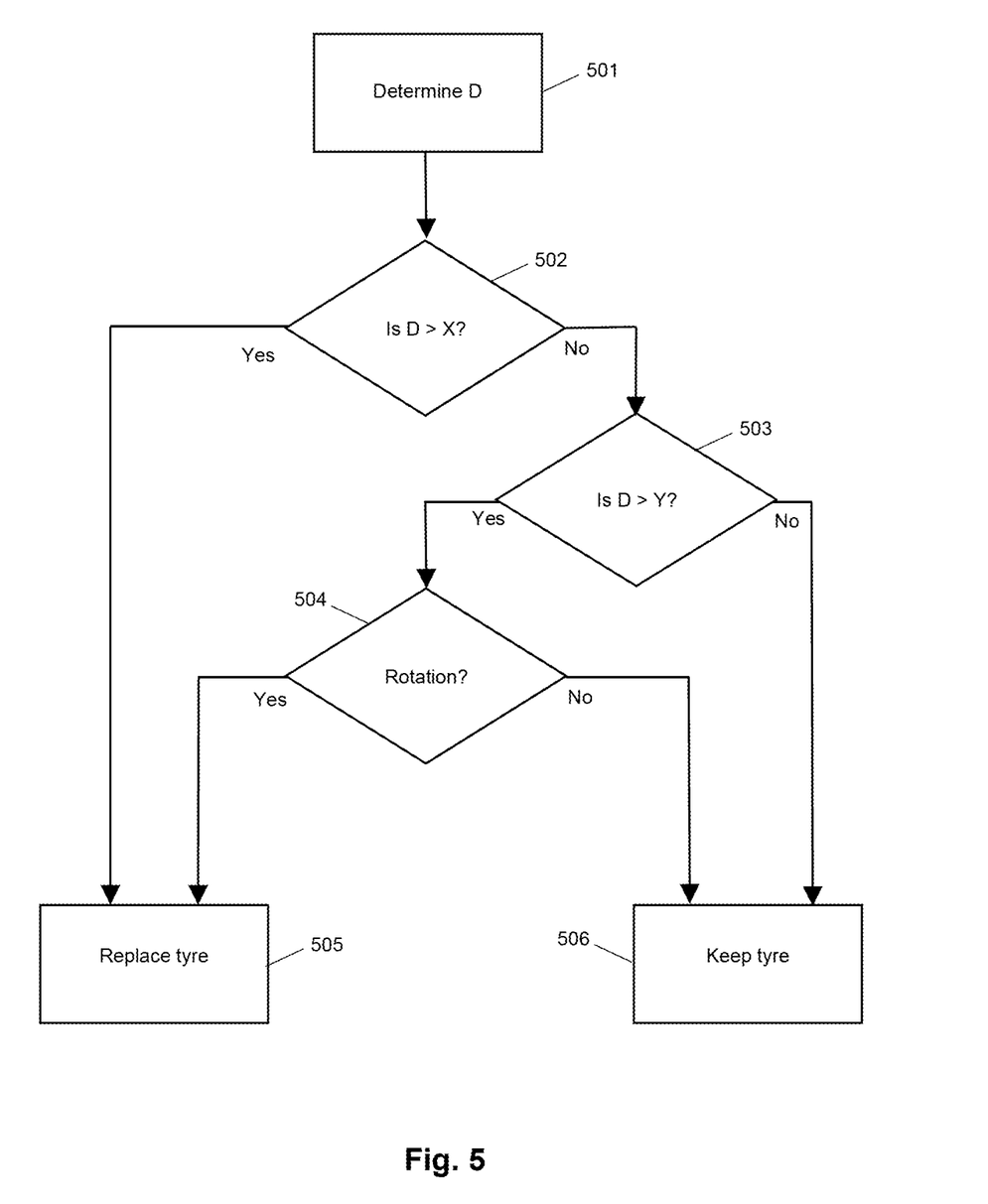
FIG. 5 is a flow chart illustrating a process for determining whether a tyre should be replaced, according to an embodiment.

It will be appreciated that a relatively higher deflection may be acceptable for allowing a tyre to remain on an aircraft, if it is known that that tyre has not rolled whilst experiencing the relatively higher deflection, as compared to a relatively lower deflection that would require replacement of the tyre if that tyre had rolled whilst experiencing the relatively lower deflection. As such, in some examples a predefined criterion for use in determining whether a tyre should be replaced comprises a first threshold, which applies to tyres that have rolled, and a second higher threshold that applies to tyres that have not rolled. FIG. 5 is a flow chart illustrating an example process for applying these thresholds in determining whether a tyre should be replaced.

In a first process block 501, a deflection D of the subject tyre is determined, e.g. by the controller 110. The determination may be performed as described above in relation to the operation of the controller 110. The determined deflection D is associated with a time, e.g. the acquisition time of a pressure measurement and a load measurement used to determine D.

In a second block 502, it is determined (e.g. by the controller 110) whether the determined deflection D exceeds a first threshold X. The first threshold X comprises a relatively high deflection, and the value of X is set such that tyres which have experienced deflections greater than X should be replaced irrespective of whether or not they have rolled. Thus, in the case where D is greater than X, the process moves to block 505 in which a determination that the subject tyre should be replaced is generated. In the case where D is not greater than X (e.g. it is equal to X, or is less than X), the process moves to block 503.

In block 503, it is determined (e.g. by the controller 110) whether the determined deflection D exceeds a second threshold Y. The second threshold Y is lower than the first threshold X. The value of the second threshold Y is set such that tyres which have experienced deflections greater than Y (but less than X) should be replaced only if they have rolled. Thus, in the case where D is not greater than Y (e.g. it is equal to Y, or is less than Y), the process moves to block 506 in which a determination that the subject tyre should be kept (or should not be replaced) is generated.

In the case where D is greater than Y (i.e. the determined deflection is between the second threshold and the first threshold), the process moves to block 504. In block 504 it is determined (e.g. by the controller 110) whether the received rotation information indicates that the tyre has rotated in a time period during which the determined deflection exceeds the second threshold (hereinafter referred to as the "deflected time period"). In some examples performing block 504 comprises defining a deflected time period during which the determined deflection exceeds the second threshold Y.

Such a deflected time period can be defined, e.g. based on the determined deflection D, and on determined deflections associated with times before and/or after the time associated with D. In some examples the deflected time period is defined such that a start time of the time period comprises a time associated with an earliest determined deflection which exceeds the second threshold Y and an end time of the time period comprises a time associated with a latest determined deflection which exceeds the second threshold Y. In examples in which D is based on current pressure and load measurements, such that D represents the current tyre deflection, the end time will be the time associated with D.

The manner in which the determination of whether the received rotation information indicates that the tyre has rotated in the deflected time period will depend on the nature of the tyre rotation information, and can comprise any suitable determination process. In a particular example in which the tyre rotation information comprises a time-series of measured values of wheel rotation velocity, determining whether the received rotation information indicates that the tyre has rotated in the deflected time period comprises determining whether any of the measured values corresponding to times falling within the deflection time period are non-zero. If at least one measured value corresponding to a time falling within the deflection time period is non-zero, it is determined that the received rotation information indicates that the tyre has rotated in the deflected time period. Conversely, if all measured rotation velocity values corresponding to times falling within the deflection time period are zero, it is determined that the received rotation information indicates that the tyre has not rotated in the deflected time period.

In cases in which it is determined in block 504 that the received rotation information indicates that the tyre has rotated in the deflected time period, the process moves to block 505, in which a determination that the tyre should be replaced is generated. In cases in which it is determined in block 504 that the received rotation information indicates that the tyre has not rotated in the deflected time period, the process moves to block 506, in which a determination that the subject tyre should be kept (or should not be replaced) is generated.

In some examples the controller 110 is further configured to output a signal based on the determined deflection. The signal may comprise, for example, one or more determined deflection values. The signal may alternatively or additionally comprise an indication of whether the subject tyre should be replaced. The controller 110 can be configured to output the signal to a communications interface of the apparatus. In some examples the signal is configured to be received by a remote electronic device (i.e. an electronic device located remotely from the apparatus 100), such as a portable electronic device used by airport ground crew, or an electronic device in an aircraft cockpit. The signal may have any suitable form known in the art.

In some examples the controller 110 is further configured to determine whether a further tyre on the same axle as the subject tyre should be replaced, based on the determined deflection of the subject tyre. As mentioned above, a correctly inflated tyre on the same axle as an under-inflated tyre can experience a higher load than intended. In such situations where there is a pressure differential between two tyres on the same axle, the correctly inflated tyre will carry more load than the under-inflated tyre, and indeed may carry more load than it was designed to. The deflection experienced by each tyre will necessarily be equal, and may be sufficient to require replacement. Furthermore, if the subject tyre has rolled during a deflected time period, the further tyre will necessarily also have rolled during the deflected time period. Therefore, if it is determined that the subject tyre should be replaced, in some examples the controller 110 is configured to additionally determine that a further tyre on the same axle as the subject tyre should be replaced. Conversely, if it is determined that the subject tyre should not be replaced, in such examples the controller 110 is configured to additionally determine that a further tyre on the same axle as the subject tyre should not be replaced.

Figure 6:
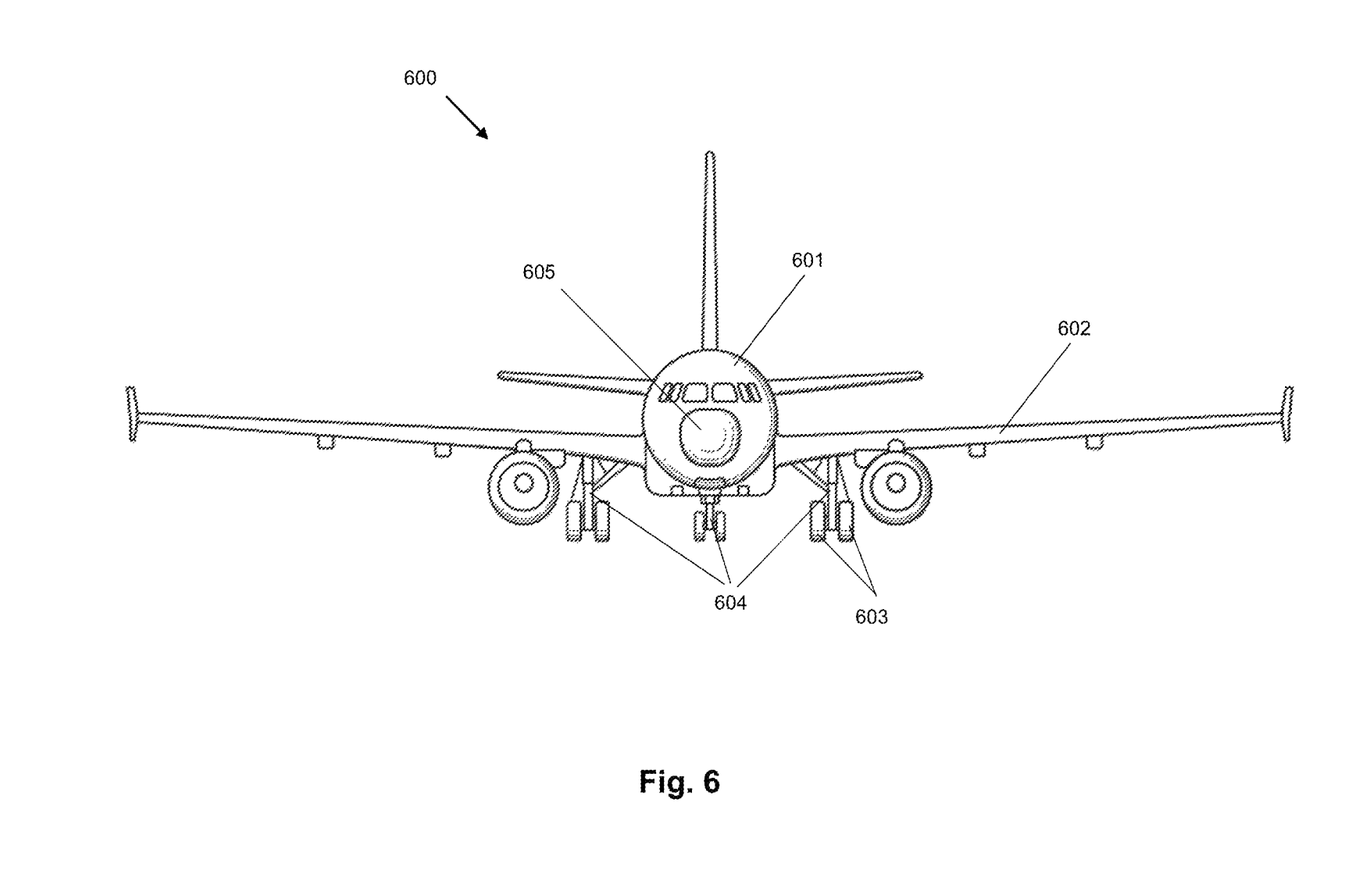
FIG. 6 is a schematic view of an aircraft comprising an apparatus for monitoring deflection of a tyre, according to an embodiment.

FIG. 6 shows an aircraft 600 on which an apparatus according to the examples (e.g. the apparatus 100) is installed. The aircraft comprises a fuselage 601, wings 602, and main and nose landing gear 604. Two wheels are attached to each landing gear 604, via an axle. Each wheel has a tyre 603. The aircraft 600 further comprises an apparatus for monitoring deflection of a tyre. The aircraft 600 further comprises a load sensor configured to measure the load on an axle of a wheel on which a tyre is installed and to transmit an axle load measurement to the apparatus. Indeed, the in the particular example of FIG. 6, two such load sensors are provided on each axle (one in respect of each tyre), in the arrangement described above in relation to FIG. 3. The aircraft 600 further comprises a pressure sensor configured to measure the pressure of a tyre and to transmit a tyre pressure measurement to the apparatus. In the particular example each tyre 603 is provided with such a pressure sensor.

The pressure sensors form part of a TPIS system of the aircraft, and a control unit of the TPIS unit is configured to transmit tyre pressure information to the apparatus. A controller (e.g. the controller 110) of the apparatus is configured to communicate with each load sensor and each pressure sensor (via the TPIS control unit, in the case of pressure sensors). It will be appreciated that alternative arrangements are possible in which the controller communicates directly with the pressure sensors.

In some examples the aircraft further comprises a rotation sensor configured to detect rotation of a wheel on which the tyre is installed and to transmit rotation information to the apparatus. The rotation sensor may be comprised in, e.g., a speed measurement, brake monitoring or anti-skid system of the aircraft 600. In some such examples, each wheel of the aircraft is provided with a rotation sensor (e.g. a tachometer).

The aircraft 600 further comprises an avionics system 605, and in the particular example the controller and the memory of the apparatus are comprised in the avionics system 605. The avionics system 605 is located in an avionics bay or compartment. In the particular example the avionics bay is in the nose of the aircraft below the cockpit, but it may be in a different location depending on the type of aircraft. The avionics system 605 comprises the electronic systems associated with flying the aircraft, including airborne communication and navigation systems and flight control systems. The avionics system 605 may comprise all of the electronics associated with communicating information to other parts of the aircraft 600.

Alternative arrangements are possible for the apparatus. For example, the controller and the memory may be comprised in a portable electronic device, e.g. for used by airport ground crew. In such examples the load sensors and pressure sensors are configured to transmit load information and pressure information respectively to the portable electronic device, e.g. using a wireless communications protocol. In other examples, functions of the controller may be split between an aircraft system and a portable electronic device. In one such example an aircraft system is configured to receive the load and pressure information, to store the tyre behaviour information, and to determine a deflection based on the load information, pressure information and tyre behaviour information. However; the aircraft system is further configured to output a signal comprising the determined deflection to a portable electronic device. The portable electronic device is configured to determine whether the tyre should be replaced, based on the received determined deflection.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A system for monitoring deflection of a tire, the system comprising:
 a first sensor configured to sense load data indicative of a load on an axle and to transmit the load data, and
 a second sensor configured to sense first pressure data indicative of pressure in a first tire mounted to a first wheel on the axle, and to transmit the first pressure data;
 a third sensor configured to sense second pressure data indicative of pressure in a second tire mounted to a second wheel on the axle, and to transmit the second pressure data;
 a non-transitory memory, storing tire behavior information which relates tire deflection to tire load and tire pressure; and
 a controller in communication with the memory, the controller being configured to:
  receive the load data and calculate a load on the axle using the load data;
  receive the first pressure data and calculate a pressure in the first tire;
  receive the second pressure data and calculate a pressure in the second tire;
  calculate a load on the first tire based on the calculated load on the axle, the calculated pressure in the first tire, and the calculated pressure in the second tire;
  determine a deflection of the first tire based on the calculated load on the first tire, the calculated pressure in the first tire, and the stored tire behavior information, and
  output a signal indicating the determined deflection.

2. The system of claim 1, wherein the controller is further configured to determine whether the first tire should be replaced, if the determined deflection exceeds a threshold deflection.

3. The system of claim 2, wherein the controller is configured to determine whether the first tire should be replaced by determining whether the determined deflection meets a predefined deflection criterion.

4. The system of claim 3, wherein the predefined deflection criterion comprises a deflection threshold, such that a determined deflection greater than the threshold meets the criterion and a determined deflection less than the threshold does not meet the criterion.

5. The system of claim 2, wherein the controller is further configured to receive rotation information relating to rotation of the wheel on which the first tire is installed, and is configured to determine whether the first tire should be replaced additionally based on the received rotation information.

6. The system of claim 5, wherein the controller is configured to determine whether the first tire should be replaced by determining whether the received rotation information meets a predefined rotation criterion.

7. The system of claim 6, wherein the predefined rotation criterion is defined such that the received rotation information meets the rotation criterion if it indicates that the first tire has rotated during a selected time period, and does not meet the rotation criterion if it indicates that the first tire has not rotated during the selected time period.

8. The system of claim 7, wherein the selected time period is a time period during which the determined deflection meets the predefined deflection criterion.

9. The system of claim 2, wherein the controller is configured to determine whether the second tire should be replaced, based on the determination of whether the first tire should be replaced, wherein the second tire is installed on a wheel mounted on the axle as the wheel on which the first tire is installed.

10. The system of claim 1, wherein the tire behavior information comprises one or more of:
    information relating to characteristic deflection behavior of the first tire;
    a dataset of measurements of the deflection of the first tire at various different tire pressures and/or tire loads;
    a set of tire load versus tire deflection curves for various different tire pressures;
    a mathematical model of the first tire;
    a look-up table;
    a mathematical relationship relating tire deflection, tire pressure and tire load.

11. The system of claim 1, further comprising a rotation sensor configured to detect rotation of the wheel.

12. The system of claim 1 wherein the first sensor includes a load sensor on the axle and configured to sense the load on the axle and output the sensed load as the load data, and the second sensor includes a pressure sensor sensing air pressure in the first tire and outputting the sensed air pressure as the pressure data.

13. The system of claim 12 wherein the load sensor is at least one of an optical-fiber based sensor, a strain gauge, a capacitive load cell and a piezoelectric load cell.

14. A system for monitoring deflection of a tire, the system comprising:
    a first sensor configured sense load data indicative of a load on a wheel axle and to transmit the load data;
    a second sensor configured to sense pressure data indicative of pressure in a tire of the wheel and to transmit the pressure data; and
    a non-transitory memory, storing tire behavior information which relates tire deflection to tire load and tire pressure; and
    a controller in communication with the memory, the controller being configured to:
        receive rotation information indicating rotation of the tire;
        receive the load data and calculate the load on the tire;
        receive pressure data and calculate a pressure in the tire;
        determine a deflection of the tire based on the load, the pressure, and the stored tire behavior information;
        determine that the tire should be replaced if:
            the determined deflection exceeds a first threshold; or
            the determined deflection exceeds a second threshold lower than the first threshold, and the received rotation information indicates that the tire has rotated during a time period for which the determined deflection exceeds the second threshold;
        determine that the tire should not be replaced if:
            the determined deflection is between the second threshold and the first threshold, and the received rotation information indicates that the tire has not rotated during a time period for which the determined deflection exceeds the second threshold, and
        output a signal indicating the tire should be replaced if the determination of whether the tire should be replaced is that the tire should be replaced.

15. A method to monitor deflection of a first tire mounted to a first wheel supported on an axle, wherein the axle supports a second wheel to which is mounted a second tire, the method comprising:
    sensing by a first sensor load data indicative of a load on the wheel axle and transmitting the load data;
    measuring by a first pressure sensor air pressure in the first tire and measuring by a second pressure sensor air pressure in the second tire, and transmitting the air pressure measurements made by the first and second pressure sensors;
    retrieving from a non-transitory memory tire behavior information which relates tire deflection to tire load and tire pressure;
    receiving automatically the load data and the air pressure measurements;
    calculating a load on the first tire based on the load data and the air pressure measurements;
    calculating a deflection of the first tire based on the calculated load on first tire, the air pressure measurement made by the first pressure sensor, and the tire behavior information;
    generating a notice to service the tire if the deflection of the tire exceeds a certain deflection threshold, and
    outputting the notice.

16. The method of claim 15 wherein the steps of the method are performed automatically by a controller.

17. The method of claim 15 wherein the air pressure measurements and the axle load measurement are made contemporaneously.

18. The method of claim 15 wherein the air pressure measurements and the axle load measurement are made at the same time.

* * * * *